April 22, 1958 — S. COUPER — 2,831,360
FLEXIBLE CHAIN
Filed March 28, 1956 — 2 Sheets-Sheet 1

INVENTOR.
SAMUEL COUPER
BY
ATTORNEY

April 22, 1958
S. COUPER
2,831,360
FLEXIBLE CHAIN
Filed March 28, 1956
2 Sheets-Sheet 2
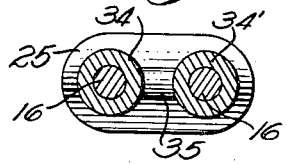
Fig. 4.
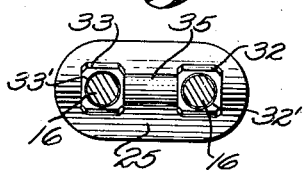
Fig. 5.
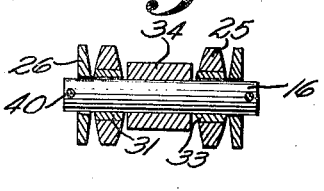
Fig. 6.
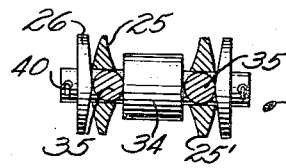
Fig. 7.
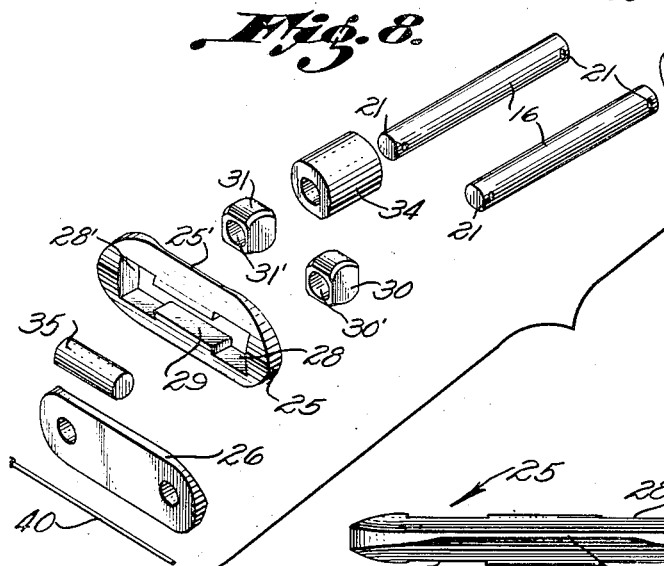
Fig. 8.
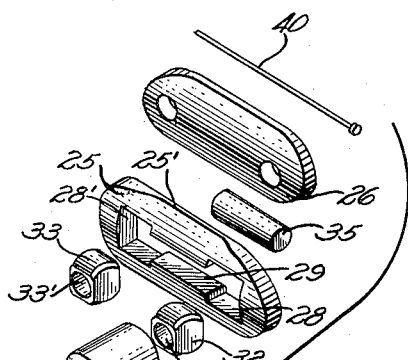
Fig. 9.
Fig. 11.
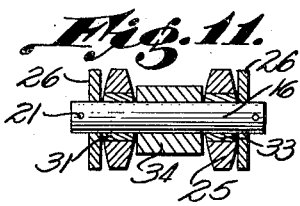
Fig. 13.
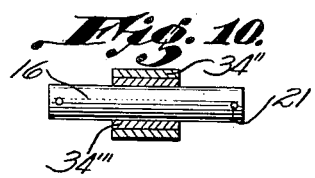
Fig. 10.
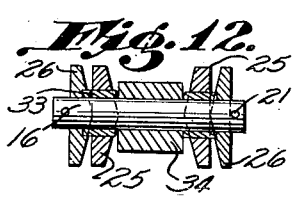
Fig. 12.
INVENTOR.
SAMUEL COUPER
BY
ATTORNEY ure 2,831,360
Patented Apr. 22, 1958

2,831,360

FLEXIBLE CHAIN

Samuel Couper, Baltimore, Md.

Application March 28, 1956, Serial No. 574,443

13 Claims. (Cl. 74—245)

The present invention relates to a chain for operating about a sprocket wheel having the customary sprocket teeth. The present chain is an improved modification of the chain shown in my Patent 2,458,682.

The chain, now the subject matter of this invention is of a more rugged nature than the one shown in my previous patent, it being prepared particularly for heavier operations and is provided with bearings inserted within the inner side members of the link to support the link connecting pin and roll bearings along the center area of the inner side member to engage the side of the sprocket teeth as the chain link moves on to and off the sprocket.

The primary object of the invention is to provide an improved sprocket chain that will operate effectively between sprockets not in the same plane.

Another object of the invention is to provide a novel means for obtaining a twist in the chain with a minimum amount of strain on any of the link elements.

A further object of the invention is to provide such a chain that may be used on the standard type sprocket.

Still another object of the invention is to so design its several parts that they may be produced on standard machines from standard stock.

While several objects of the invention have been stated other objects may become apparent to one skilled in the art. The uses and advantages of the invention will become more apparent as the nature of the invention is more fully disclosed, which consists in its novel construction, combination and arrangement of its several parts, as described in the following specification and illustrated in the accompanying drawings, in which:

Figure 4 is a section taken along line 4—4 of Figure 2.

Figure 5 is a sectional line taken along line 5—5 of Figure 2.

Figure 6 is a sectional view taken on line 6—6 of Figure 2.

Figure 7 is a sectional view taken on line 7—7 of Figure 2.

Figure 8 is an exploded view showing the different elements of the improved chain line in relative position to be assembled.

Figure 9 is a sectional view of a modified form of connecting pin and a single roll carried thereon.

Figure 10 is a sectional view of still another modified form of a combination pin and a pair of rolls, one roll being rotatably mounted over the other.

Figure 11 is a view similar to Figure 6 in which the inner side members are tapered on both sides so the outside members have their sides parallel over the other.

Figure 12 is a sectional view similar to Figure 6, in which the inner side members are tapered only on one side thereof.

Figure 13 is an enlarged top plan view looking at the elongated edge of a single side inner link member.

In referring to the drawings like reference characters are used to designate like and similar parts throughout the several views.

Figure 1:
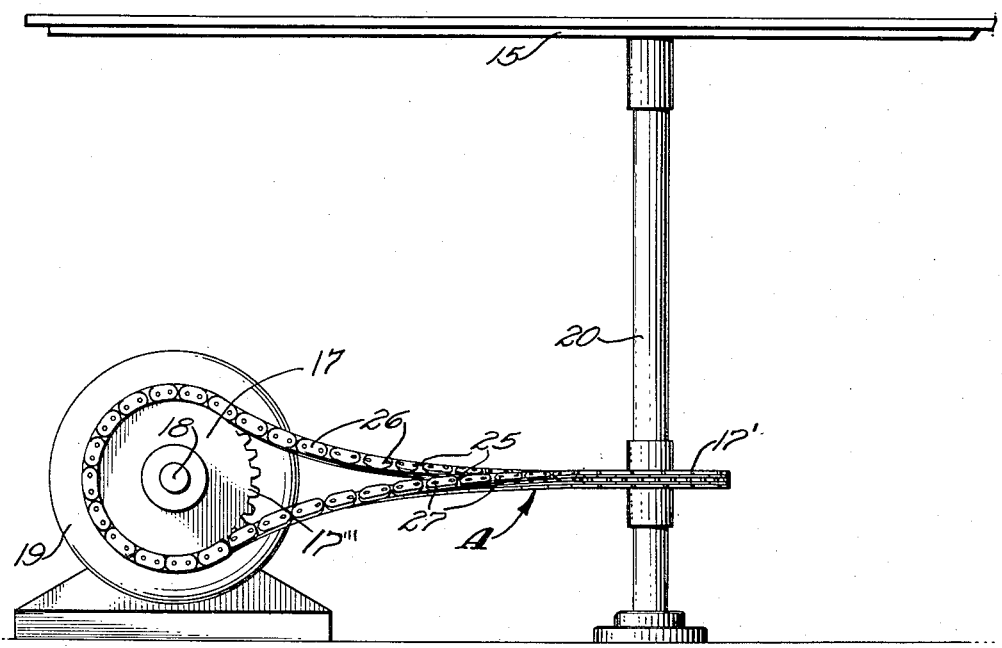
Figure 1 is a view in elevation of a pair of sprockets operating in planes at right angles to each other and connected by a single length of the improved chain.
Figure 2:
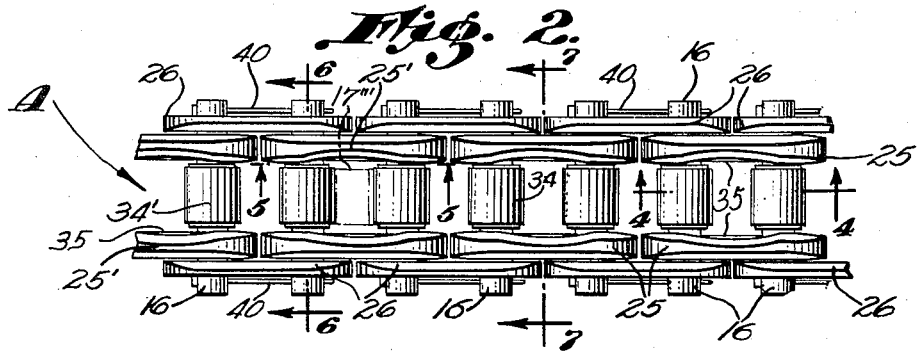
Figure 2 is an enlarged top plan view of a section of the chain.
Figure 3:
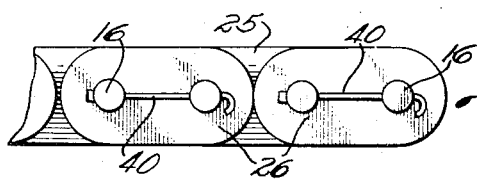
Figure 3 is a view in elevation of a few links of the chain.

Figure 1 illustrates one of the many uses to which the chain may be put. In this figure the chain A is being used to rotate a platform 15. The chain A extends between the sprockets 17 and 17'. The sprocket is secured and rotated by a horizontal shaft 18, which is rotated by an electric motor 19, the sprocket wheel 17 being supported in a vertical plane. The sprocket 17' is secured to the vertical shaft 20, which supports the sprocket 17' in a horizontal plane adjacent its bottom end and the platform adjacent its upper end. The sprockets 17 and 17' are provided with teeth such as shown at 17''' on sprocket 17.

The detail formation of the link itself is illustrated in Figures 2 to 11 inclusive. The present chain link follows generally the conventional type, in that, it is provided with inner side link members 25 and outer side link members 26 having suitable apertures extending through their ends for admitting a connecting pin 16. The invention lies in the particular structure of the chain parts together with the novel manner in which they are combined and all of which will be later referred to more in detail. Figures 3 to 8 inclusively illustrate one of the preferred forms the chain may take.

Beginning with the inner side members 25 these members are provided with a pair of apertures 28 and 28' adjacent each end thereof and extending between the apertures 28 and 28' is a slot 29. The apertures 28 and 28' are adapted to receive bearing bushing members 30, 31, 32 and 33. The bearing bushing members are provided with apertures 30', 31', 32' and 33' which are in turn adapted to slidably receive the pins 16. It will be noted that the bearing bushings have an arcuated top and bottom surface to allow the inner link member to pivot on its long axis within limits. Over the pins 16 are rolls 34 and 34' which are located adjacent the center of the pin for engaging the sprocket. The location of the roll 34 and 34' relative to the pin is shown in Figure 7. The inner connecting link members are slightly thinner along an area adjacent their center as shown at 25' than they are in the area adjacent their end. There is provided a second roll bearing 35 which is adapted to slidably fit into the slots 29 of the inner side members 25 having their ends rotatably mounted between the adjacent ends of the bearing bushings 30 to 33. The diameter of the roll bearing 35 has a diameter slightly greater than the thickness of the elongated center portion of the inner side members 25, in order that the sprocket tooth will contact the roll as the chain moved onto the sprocket. The inner side members 25 are provided with a double tapered face on at least one side thereof, as shown in Figure 12, however they may be tapered on both sides as shown in Figures 6 and 7. The outer side members 26 may be formed with both its sides in parallel planes, as shown in Figure 11, or having its inner sides tapered, as shown in Figures 7 and 12. Generally the outside link members do not have a bearing bushing 30 and are thinner than the inner link side members. However, if the twist of the chain requires it a bushing similar to that shown for the inner side link members may be used in the outside link members.

Several modified forms of the connecting pin are illustrated. In Figure 8 the pin 16 is substantially the same diameter throughout its entire length, with a single roll bearing 34. In Figure 9 there is illustrated a pin 16' having an enlarged central portion 16" and a single roll bearing 34" having an increased diameter to slidably accommodate the portion 16" of pin 16.

Figure 10 shows a pin 16 similar to the one described in Figure 8. The sprocket roll bearing is made up of two roll members, an outer roll 34" as shown and described in Figure 9 and an inner roll 34''' to take the place of the enlarged portion 16" shown on the pin 16 in Figure 9.

The chain is assembled as shown in Figures 2 to 7 inclusive, that is, the bearing roll 34 and 34' are moved over the pins 16, the bearing bushings 30 to 32 are moved over the outer ends of the pins 16 adjacent each side of the roll 34 and 34'. Over the bearing bushings the inner side link members are moved in contact with the roll members 34 and 34'. Next the side roll bearings 35 are inserted within the slotted opening 29 of the inner side link members and over the outer ends of the pins 16 there is placed the outer side link member 26. Extending slightly beyond the outer face of the outer side link members are small apertures 21 through which a suitable key 40 is inserted to hold the various link elements rotatably supported upon the connecting pins 16. The key 40 is only one form of key that may be used. The ends of the pins may be expanded, or they may have extending through the apertures 40 a well known cotter pin.

The chain is designed for use where the sprockets over which the chain is trained are not permanently in the same plane, or the planes of the sprockets may be changed or do change during their operation. The chain is usable in many places throughout the industrial field and is particularly adaptable for use in place of V belts used with pulleys on misaligned shafts. These V belts have a tendency to turn over and to cause other troubles such as slippage.

While the principles of the invention are shown and described in a specific form, it is not intended to limit the invention in any way and the scope thereof is best found in the appended claims.

I claim:

1. A sprocket drive chain having a plurality of connecting links, comprising adjacent inner and outer side connecting members, the inner side members being provided adjacent their ends with rectangular apertures having two straight sides extending substantially parallel with the longitudinal axis of the said inner side members and the other two sides extending substantially perpendicular thereto, a separate bearing adapted to be slidably receivable within each of said apertures in the inner side members, the rectangular bearings each having an aperture extending centrally and laterally therethrough, the outer side members having apertures in each end thereof, a pin adapted to have its end portions extend through the apertures in each of the rectangular bearings and the apertures in the adjacent outer side members, and means carried along the central section of each pin and between the inner side links for engaging a sprocket.

2. A sprocket chain as set forth in claim 1 in which the inner side members are each provided with a roll bearing for engaging the side of the sprocket teeth, the roll bearing being positioned at a point substantially halfway between the two ends of the inner side members, the roll bearing having a portion of its surface extending inwardly beyond the inner surface of the inner connecting members.

3. A sprocket chain as set forth in claim 1 in which each inner side member is provided with a cylindrical roll bearing for engaging the side of the sprocket teeth of the sprocket, the roll bearing being positioned along the elongated axis of the inner side member and supported thereby and having a portion of its surface extending inwardly beyond the inner surface of the inner connecting member.

4. A sprocket chain as set forth in claim 1 in which at least one of the side surfaces of each of the inner side members is tapered from its elongated center line to its respective elongated edges and toward its respective opposite side surfaces.

5. A sprocket chain as set forth in claim 1 in which the sides of the link members are tapered from their elongated center lines to their respective elongated edges and toward their respective opposite side surfaces.

6. A twistable sprocket chain for toothed sprockets having a plurality of connecting links, comprising inner and outer side connecting members, the ends of the connecting members being provided with apertures therein, the apertures in the inner side members being provided with bearings having apertures therethrough, a pin adapted to have its end portions extending through the apertures of the bearings carried by the inner side connecting members and the apertures in the outer side connecting members, and a roll bearing carried along the central section of the pin and between the inner side members for engaging a sprocket.

7. A chain for toothed sprockets as set forth in claim 6, in which the inner link members are provided with an elongated central area of substantially greater thickness than the lateral edges of the inner link members.

8. A chain for toothed sprockets as set forth in claim 6 in which the inner side members are provided with roll bearings extending inwardly beyond the inner faces of the inner side members for engaging the sides of the sprocket teeth.

9. A chain for toothed sprockets as set forth in claim 6 in which the inner side members are free floating in a plane substantially perpendicular to the elongated axis of the pins within predetermined limits.

10. A chain for toothed sprockets comprising, in combination, a plurality of connecting links, each link having adjacent inner and outer elongated side members, a pin extending through apertures in the ends of the side members, separate bushing bearings within the apertures in the inner side members for receiving the pin, and means carried between the inner side members on the pin axis for engaging a sprocket, the bushing bearings having arcuated top and bottom bearing surfaces for allowing the inner side members to pivot on their long axis when the chain is twisted.

11. A twistable sprocket chain for tooth sprockets having a plurality of connected links comprising in combination, pairs of inner and outer side link members, the ends of the connecting members being provided with apertures, separate bushing bearings adapted to be receivable within said apertures, said bearings having apertures therethrough, pins adapted to have their end portions extending through the aperture in the bearings, roll bearings receivable over the pins adapted to contact the sprocket teeth, second roll bearings having their elongated axis perpendicular to the axis of the pin supported in the inner connecting link members and means at each end of the pins for holding the side link members and the roll bearings in assembled relationship.

12. A sprocket as claimed in claim 11 in which at least one pair of side links are tapered from their elongated center lines to each of their respective elongated edges and toward their respective opposite sides.

13. A chain for tooth sprockets as set forth in claim 11 in which at least one pair of corresponding side members are free floating normal to the elongated axis of the pin within certain limits.

References Cited in the file of this patent

UNITED STATES PATENTS

| | | |
|---|---|---|
| 1,590,391 | Parent | June 29, 1926 |
| 1,933,653 | Bremer | Nov. 7, 1933 |
| 1,939,986 | Klaucke | Dec. 19, 1933 |
| 2,458,682 | Couper | Jan. 11, 1949 |